(12) United States Patent
Sato et al.

(10) Patent No.: US 9,958,340 B2
(45) Date of Patent: May 1, 2018

(54) TEMPERATURE SENSOR

(71) Applicant: DENSO CORPORATION, Kariya, Aichi-pref. (JP)

(72) Inventors: Motoki Sato, Kariya (JP); Tsunenobu Hori, Kariya (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 14/807,090

(22) Filed: Jul. 23, 2015

(65) Prior Publication Data
US 2016/0025576 A1    Jan. 28, 2016

(30) Foreign Application Priority Data

Jul. 24, 2014 (JP) .................................. 2014-150762
Mar. 6, 2015 (JP) .................................. 2015-045235

(51) Int. Cl.
*G01K 7/16* (2006.01)
*G01K 1/08* (2006.01)
*H01C 1/034* (2006.01)

(52) U.S. Cl.
CPC ................. *G01K 7/16* (2013.01); *G01K 1/08* (2013.01); *H01C 1/034* (2013.01)

(58) Field of Classification Search
USPC ........................................................ 374/185
See application file for complete search history.

(56) References Cited

U.S. PATENT DOCUMENTS

| 3,726,987 | A | * | 4/1973 | Pryor | ...................... | A47J 36/02 |
| | | | | | | 174/50.61 |
| 2009/0295290 | A1 | * | 12/2009 | Magai | ................... | H01J 61/366 |
| | | | | | | 313/623 |
| 2013/0077653 | A1 | * | 3/2013 | Koshimizu | .............. | G01K 7/22 |
| | | | | | | 374/185 |

FOREIGN PATENT DOCUMENTS

| JP | 59-142737 | | 9/1984 |
| JP | S64-002302 | | 1/1989 |
| JP | 3-263302 | | 11/1991 |
| JP | 5-172651 | | 7/1993 |
| JP | 7-318435 | | 12/1995 |
| JP | 2002037641 | A * | 2/2002 |
| JP | 2005-045175 | | 2/2005 |
| JP | 2005-294653 | | 10/2005 |
| JP | 2009-288023 | | 12/2009 |
| JP | 2011-232066 | | 11/2011 |
| JP | 2013-072769 | | 4/2013 |

\* cited by examiner

*Primary Examiner* — Clayton E Laballe
*Assistant Examiner* — Leon W. Rhodes, Jr.
(74) *Attorney, Agent, or Firm* — Nixon & Vanderhye PC

(57) ABSTRACT

A temperature sensor includes a thermo-sensitive element, a pair of element electrode wires electrically connected to the thermo-sensitive element, a glass sealing body that covers the thermo-sensitive element and part of the pair of the element electrode wires, and a tablet formed with a pair of insertion holes extending in an axial direction thereof, through which the pair of the element electrode wires pass respectively. The glass sealing body includes a sealing part formed so as to extend from an element side end surface thereof located on a side of the thermo-sensitive element toward the thermo-sensitive element, and a sagging part formed in each of the pair of the insertion holes so as to extend integrally from the sealing part. The length of the sagging part in the axial direction being smaller than or equal to 1.5 mm.

12 Claims, 4 Drawing Sheets

TEMPERATURE SENSOR

This application claims priority to Japanese Patent Application No. 2014-150762 filed on Jul. 24, 2014 and No. 2015-45235 filed on Mar. 6, 2015, the entire contents of which are hereby incorporated by reference.

BACKGROUND OF THE INVENTION

1. Field of the Invention

The present invention relates to a temperature sensor.

2. Description of Related Art

Motor vehicles are provided with temperature sensors for various uses. For example, the temperature sensor described in Japanese Patent Application Laid-open No. 2013-72769 is used for detecting the temperature in a hydrogen tank of a fuel cell vehicle to control a filling rate of hydrogen into the hydrogen tank. The temperature sensor is required to be resistant to a high pressure occurring in the hydrogen tank during filling the hydrogen tank. Accordingly, the temperature sensor is provided with a sealing supplementary body to prevent a sealing glass which covers a thermo-sensitive element from being damaged. The sealing supplementary body is formed with a pair of insertion holes. A pair of lead wires electrically connected to the thermo-sensitive element can be inserted into the insertion holes.

However, the conventional temperature sensor described above has the following problems. There is a gap between the insertion hole of the sealing supplementary body and the lead wire. If melted glass flows in to the gap at the time of forming the sealing glass, a thin glass layer is formed within the gap. This thin glass layer is lower in strength than the sealing glass. Accordingly, there is a concern that the thin glass layer may be broken due to thermal shock and pressure occurring in the hydrogen tank. Further, the sealing glass may be broken as a result of breakage of the thin glass layer. Recently, since the filling time of a hydrogen tank is required to be shortened, the thermal shock at the start of filling of the hydrogen tank and the pressure within the hydrogen tank during filling of the hydrogen tank tend to increase. Therefore, there is a demand to provide a temperature sensor having an increased strength. Incidentally, the thin glass layer may pose a problem for uses other than hydrogen tanks, which require high resistivity to pressure, thermal shock or vibration.

SUMMARY

An exemplary embodiment provides a temperature sensor including:

a thermo-sensitive element;

a pair of element electrode wires electrically connected to the thermo-sensitive element;

a glass sealing body that covers the thermo-sensitive element and part of the pair of the element electrode wires; and a tablet formed with a pair of insertion holes extending in an axial direction thereof, through which the pair of the element electrode wires pass respectively, wherein the glass sealing body includes a sealing part formed so as to extend from an element side end surface thereof located on a side of the thermo-sensitive element toward the thermo-sensitive element, and a sagging part formed in each of the pair of the insertion holes so as to extend integrally from the sealing part, a length of the sagging part in the axial direction being smaller than or equal to 1.5 mm.

According to the exemplary embodiment, there is provided a temperature sensor including a glass sealing body having a high strength.

Other advantages and features of the invention will become apparent from the following description including the drawings and claims.

PREFERRED EMBODIMENTS OF THE INVENTION

Figure 1:
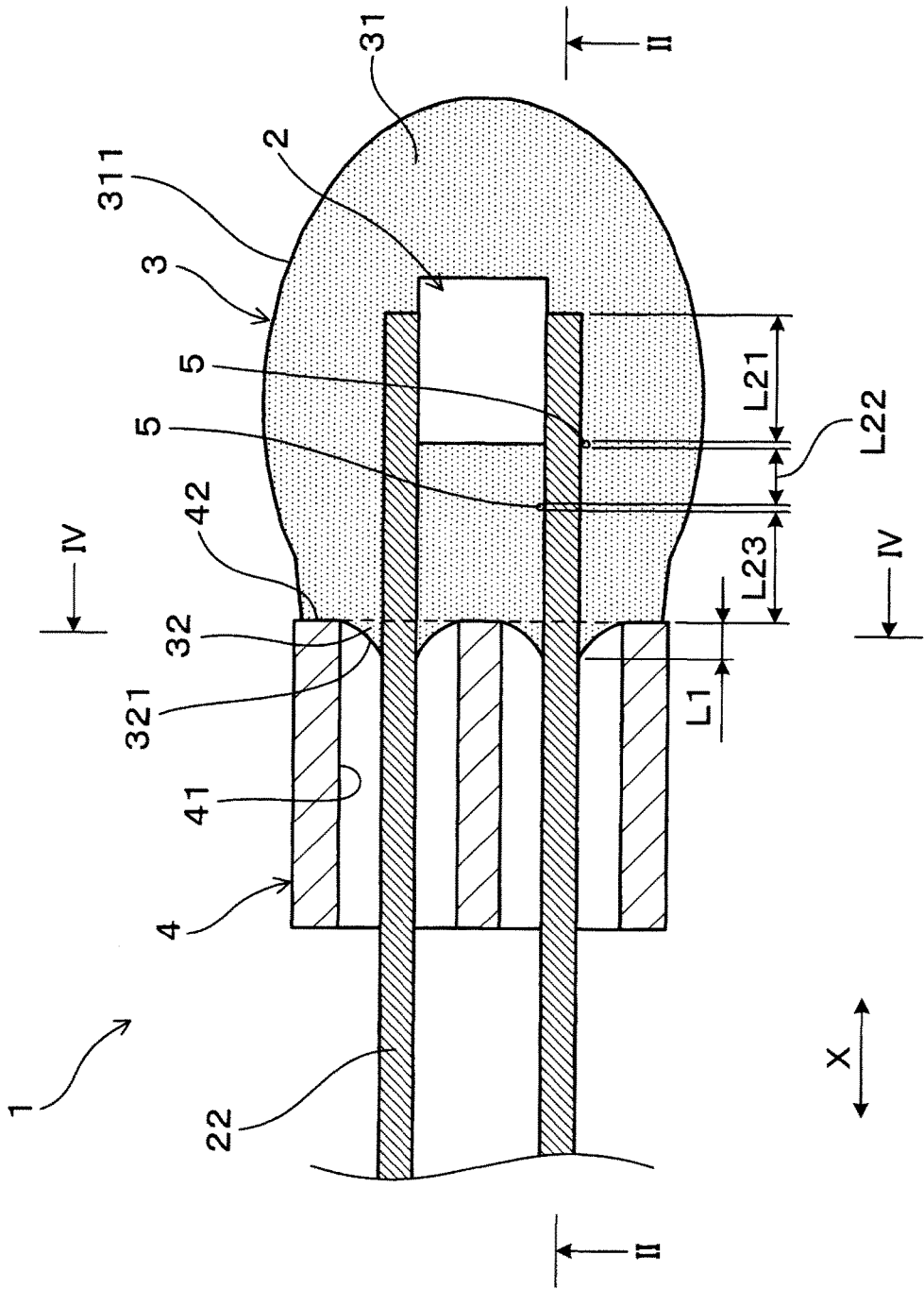
FIG. 1 is a diagram showing the structure of a temperature sensor according to an embodiment of the invention.
Figure 2:
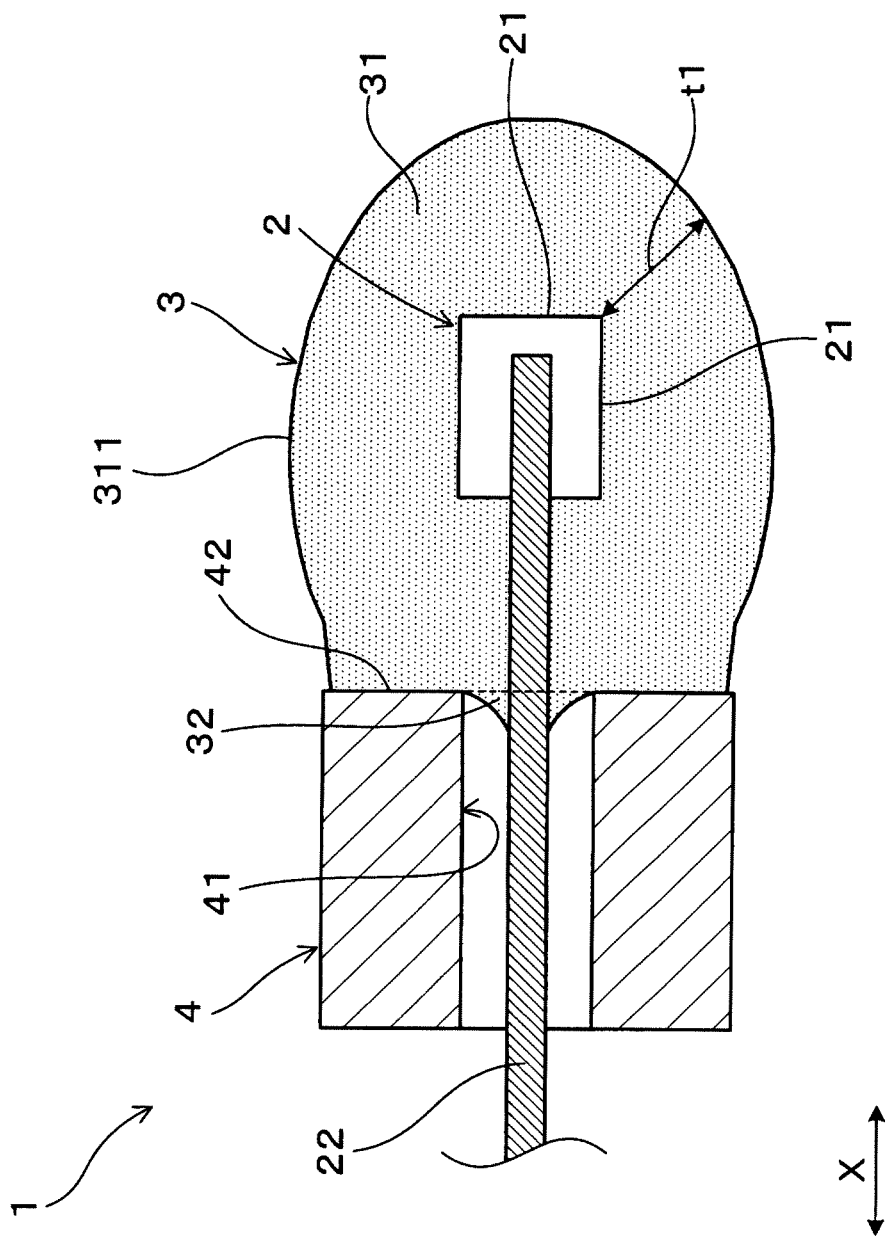
FIG. 2 is a cross-sectional view of FIG. 1 taken along line II-II.

A temperature sensor 1 according to an embodiment of the invention is described with reference to FIGS. 1 to 4. As shown in FIGS. 1 and 2, the temperature sensor 1 includes a thermo-sensitive element 2, a pair of element electrode wires 22, a glass sealing body 3 which covers the thermo-sensitive element 2 and part of the pair of the element electrode wires 22, and a tablet 4 formed with a pair of insertion holes 41 through which the pair of the element wires 22 pass. The thermo-sensitive element 2 is electrically connected with the pair of the element electrode wires 22.

The glass sealing body 3 includes a sealing part 31 formed so as to extend from an element-side end surface 42 of the tablet 4 toward the thermo-sensitive element 2, and a sagging part 32 which sags from the sealing part 31 within each of the insertion holes 41. The length L1 of the sagging part 32 in the axial direction X of the tablet 4 is smaller than or equal to 1.5 mm.

In the following description, the "distal end side" means a side in the axial direction X on which the thermo-sensitive element 2 is disposed, and the "proximal end side" means a side to which the element electrode wires 22 extend from the thermo-sensitive element 2.

The temperature sensor 1 can be used for a hydrogen tank of a fuel cell vehicle to control hydrogen filling rate in accordance with the temperature in the hydrogen tank.

As shown in FIGS. 1 and 2, the thermo-sensitive element 2, which is formed of a resistance temperature detector, is sandwiched and fixed between the element electrode wires 22 which are parallel to each other. The thermo-sensitive element 2 and the element electrode wires 22 are joined to each other in advance.

The element electrode wire 22 is made of platinum alloy, and formed in a columnar shape extending in the axial direction X. The platinum alloy is made of Pt as a base material containing 20 wt % of Ir. Accordingly, the content A of Ir is 0 wt %<A≤20 wt %. The linear expansion coefficient $\alpha_r$ of the element electrode wire 22 is $8.4 \times 10^{-6}$/° C.

Figure 4:
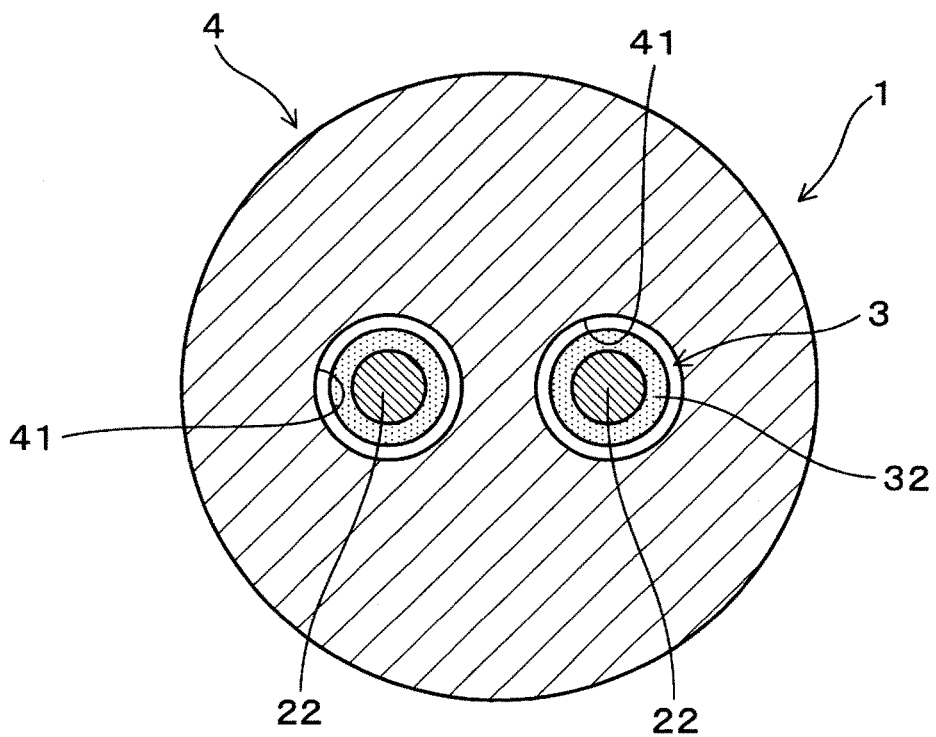
FIG. 4 is a cross-sectional view of FIG. 1 taken along line IV|IV.

As shown in FIGS. 1, 2 and 4, the tablet 4 is made of ceramic material containing alumina as a base material formed in a columnar shape. The tablet 4 is formed with the pair of the insertion holes 41 penetrating through the tablet 4 in the axial direction X. The diameter of the insertion hole 41 is slightly larger than the diameter of the element electrode wire 22 so that the element electrode wire 22 can be inserted into the through hole 41.

The glass sealing body 3 is made of lead-free borosilicate glass which does not contain lead and is added with boron oxide. The linear expansion coefficient $\alpha_g$ of the glass sealing body 3 is $8.5 \times 10^{-6}/°$ C. The glass sealing body 3 includes the sealing part 31 formed closer to the distal end side than the tablet 4 is, and the sagging parts 32 which extend from the sealing part 31 to the proximal end side within the through holes 41.

The sealing part 31 is formed so as to cover the thermo-sensitive element 2 and the distal end portions of the element electrode wires 22. The sealing thickness t1, or the distance between the outer surface 311 of the sealing part 31 and the thermo-sensitive element 2 is in the range of $1.4 \text{ mm} \leq t1 \leq 3.0$ mm. The contact length L2, or the length of a contact part between the sealing part 31 and the element electrode wire 22 is in the range of $1.4 \text{ mm} \leq L2 \leq 3.0$ mm ($L2=2.0 \pm 0.4$ mm, in this embodiment). Here, the contact part does not include a portion where a tiny air bubble 5 is present in the interface between the sealing part 31 and the element electrode wires 22 to prevent the sealing part 31 from being in direct contact with the element electrode wires 22. More specifically, the contact length L2 is the sum of lengths L21, L22 and L23 shown in FIG. 1.

Figure 3:
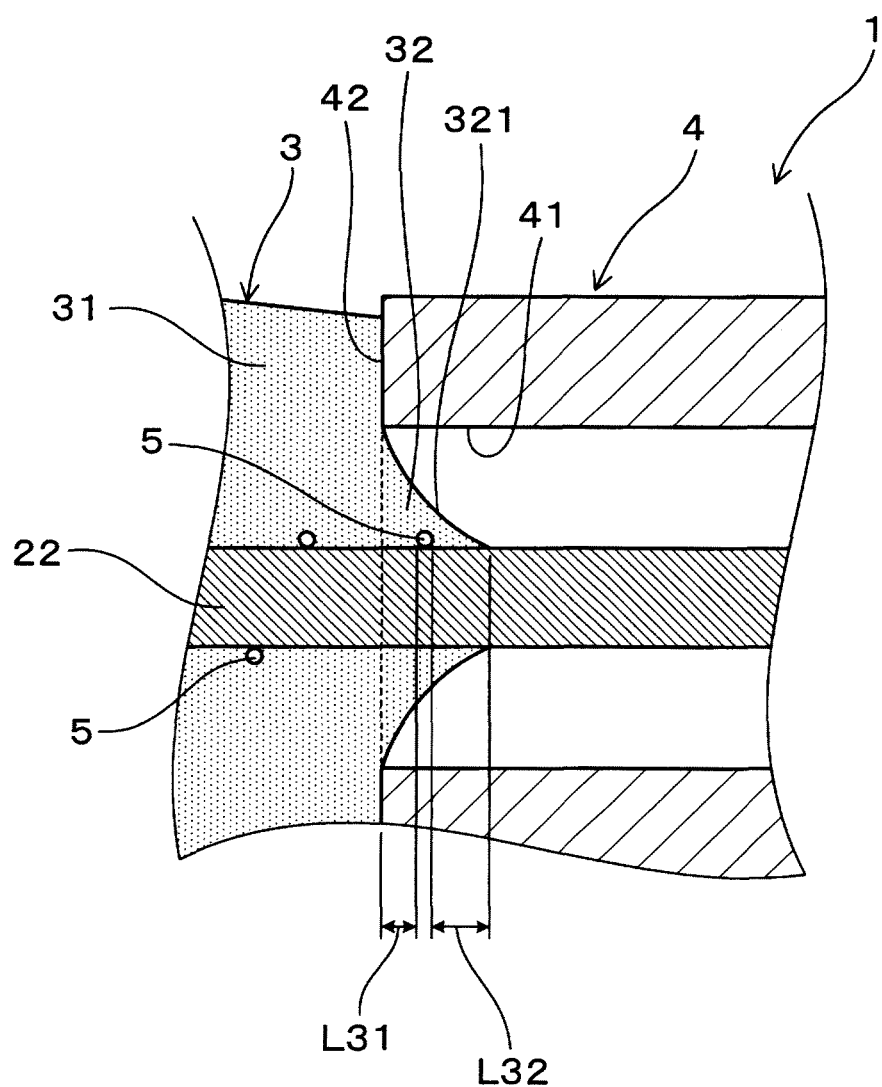
FIG. 3 is a partial enlarged cross-sectional view of the temperature sensor.

As shown in FIGS. 1 to 3, the sagging part 32 is formed so as to extend from the distal end side of the sealing part 31 into the insertion hole of the tablet 4. The length L1 in the axial direction X of the sagging part 32 is smaller than or equal to 1.5 mm ($L1=0.5$ mm in this embodiment). The sagging part 32 is formed in a shape having a convex curved surface 321 whose contour in cross section including the center axis of the element electrode wire 22 approaches the element electrode wire 22 with the distance from the sealing part 31. The radius R of this convex curved surface 321 is in the range of $0.1 \text{ mm} \leq R \leq 3.5$ mm, so that the pressure applied to the convex curved surface 321 is effectively distributed to prevent the glass sealing body 3 from being damaged at the sagging part 32.

The contact length L3 ($=0.45$ mm in this embodiment), or the length of the contact part between the sagging part 32 and the element electrode wire 22 is in the range of $0 \text{ mm} < L3 < 1.5$ mm. Here, the contact part does not include a portion where a tiny air bubble 5 is present in the interface between the sagging part 32 and the element electrode wire 22 to prevent the sagging part 32 from being in direct contact with the element electrode wire 22. More specifically, the contact length L3 is the sum of lengths L31 and L32 shown in FIG. 3, which is equal to 0.45 mm.

Next, a process of manufacturing the temperature sensor 1 having the above described structure is explained. First, an electrode wire joining step of joining the pair of the element electrode wires 22 to the thermo-sensitive element 2 is performed as shown in FIG. 2. In this step, a paste containing Au is applied to the electrodes of the temperature sensor 1 and the element electrode wires 22, and then baked.

Next, a tablet inserting step of inserting the element electrode wires 22 into the insertion holes 41 of the tablet 4 is performed. In this step, the element electrode wires 22 and the tablet 4 are temporarily fixed to each other by filling the gaps between the element electrode wires 22 and the inner circumference surface of the insertion hole 41 with a glass paste. This glass paste is cured in a later-explained sealing step. The length L1 of the sagging part 32 can be made shorter than or equal to 1.5 mm by heating the glass paste at the temperature between 800° C. and 850° C. for a heating time of about 20 seconds. By reducing the heating time, or reducing an amount of the glass paste, the length L1 of the sagging part 32 can be made further shorter.

Next, there is performed a glass tube assembling step in which the element electrode wires 22 projecting from one end surface of the tablet 4 and the thermo-sensitive element 2 connected to the distal ends of the element electrode wires 22 are disposed within a cylindrical glass tube.

Subsequently, there is performed the sealing step in which the glass tube is heated to be deformed so as to form the glass sealing body 3 that covers the element electrode wires 22 projecting from one end surface of the tablet 4 and the thermo-sensitive element 2. This sealing step is performed in a state where the thermo-sensitive element 2 faces upward, and the glass tube stands on the end surface of the tablet 4. By this sealing step, the glass tube is deformed to make the glass sealing body 3, and the temperature sensor 1 is completed.

The above described embodiment provides the following advantages. Since the length L1 of the sagging part 32 is restricted, the strength of the glass sealing body 3 is increased. The sagging part 32 is formed in the gap between the insertion hole 41 and the element electrode wire 22, and accordingly is likely to become thin compared to the sealing part 31. By reducing the forming area of the thin sagging part 32, it is possible to prevent the sagging part 32 from being damaged.

If a pressure is applied to the sealing part 31 and the sagging parts 32 due to pressure change around the temperature sensor 1, stress occurs. It was found through an analysis that the sagging part 32 is applied with a higher pressure than the sealing part 31, as a result of which a high stress is applied to the sagging part 32 due to the pressure difference between the sealing part 31 and the sagging part 32.

In addition, the pressure change causes a temperature change. Since the thermal expansion coefficient of the glass sealing body 3 differs from that of the element electrode wires 2, there occurs a difference in thermal expansion amount with the temperature change therebetween, the glass sealing body 3 undergoes a thermal shock. Restricting the length L1 of the sagging part 32 makes it possible to reduce the load (a composite stress of the pressure and the thermal shock) applied to the glass sealing body 3 and prevent damage at the sagging part 32.

The sagging part 32 is formed in a shape having the convex curved surface whose contour in cross section including the center axis of the element electrode wire 22 approaches the element electrode wire 22 with the distance from the sealing part 31. Accordingly, the pressure applied to the surface of sagging part 32 can be distributed while ensuring a sufficient thickness of the sagging part 32.

The glass sealing body 3 is made of borosilicate glass with added boron oxide. This makes it possible to increase the resistivity to the thermal shock of the glass sealing body 3 to thereby prevent the glass sealing body from being damaged.

The glass sealing body 3 is made of lead-free glass. This makes it possible to reduce the wettability of the glass melted in forming the glass sealing body 3, as a result of which the length L1 of the sagging part 32 can be reduced easily, and the strength of the glass sealing body 3 can be increased.

The element electrode wire 22 is made of platinum alloy containing iridium, and the content A of iridium is in the range of $0 \text{ wt \%} < A \leq 20 \text{ wt \%}$. Accordingly, since the linear expansion coefficients of the glass sealing body 3 and the element electrode wire 22 can be made sufficiently closer to each other, the glass sealing body 3 can be prevented from being damaged due to the difference between their linear expansion coefficients. In addition, the strength of the element electrode wire 22 can be increased easily. In this embodiment, the element electrode wires 22 are made of platinum alloy containing iridium, however, instead, they may be made of pure platinum.

The linear expansion coefficient $\alpha_g$ of the glass sealing body 3 and the linear expansion coefficient $\alpha_r$ of the element electrode wires 22 satisfy the relationship of $\alpha_g-1$ $(10^{-6}/°\text{ C.}) \leq \alpha_r \leq \alpha_g+1$ $(10^{-6}/°\text{ C.})$. Accordingly, since the linear expansion coefficients of the glass sealing body 3 and the element electrode wire 22 are sufficiently closer to each other, it is possible to suppress the thermal stress between them.

The linear expansion coefficient $\alpha_g$ of the glass sealing body 3 is larger than the linear expansion coefficient $\alpha_r$ of the element electrode wire 22. Accordingly, it is possible to cause the glass sealing body 3 to contract to adhere to the element electrode wire 22 during forming of the glass sealing body 3.

The sealing thickness t1 between the outer surface 311 of the sealing part 31 and the thermo-sensitive element 2 satisfies the relationship of $0.4 \text{ mm} \leq t1 \leq 3 \text{ mm}$. Accordingly, both sufficient strength of the glass sealing body 3 and high responsivity of the thermo-sensitive element 2 can be ensured.

The contact length L2, that is, the length in the X direction of a contact part between the sealing part 31 and the element electrode wires 22 satisfies the relationship of $1.4 \text{ mm} \leq L2 \leq 3.0 \text{ mm}$. Accordingly, the element electrode wires 22 and the sealing part 31 can be adhered intimately to each other and prevented from peeling off from each other so that the sealing therebetween can be ensured to prevent intrusion of hydrogen and so on.

The contact length L3, that is, the length in the X direction of a contact part between the sagging part 32 and the element electrode wire 22 satisfies the relationship of $0 \text{ mm} < L3 \leq 1.5 \text{ mm}$. Accordingly, the element electrode wires 22 and the sagging part 32 can be adhered intimately to each other and prevented from peeling off from each other so that the sealing therebetween can be ensured to prevent intrusion of hydrogen and so on.

As described above, the temperature sensor 1 of this embodiment is capable of preventing its glass sealing body 3 from being damaged.

Analysis Test

Next, results of an analysis test performed to analyze the strength of the temperature sensor 1 are explained. The inventors of the present invention estimated the pressure applied to the temperature sensor 1 installed in a hydrogen tank when the hydrogen tank is filled with hydrogen, and analyzed the relationship between the length L1 of the sagging part 32 and the stress applied to the sagging part 32 of the glass sealing body 3 by simulation.

In this test, the stress occurred in the sagging part 32 due to the pressure applied to the surface of the sagging part 32 was calculated using analysis models of the temperature sensor 1 for each of cases where the length L1 of the sagging part 32 is, 0.5 mm, 1.0 mm, 1.5 mm, and 2.0 mm, respectively. Pressures applied to the respective components of the temperature sensor 1 during filling of hydrogen were calculated by analysis, and a pressure load condition was set based on the calculated pressures. The results of the analysis test are shown in FIG. 5.

Figure 5:
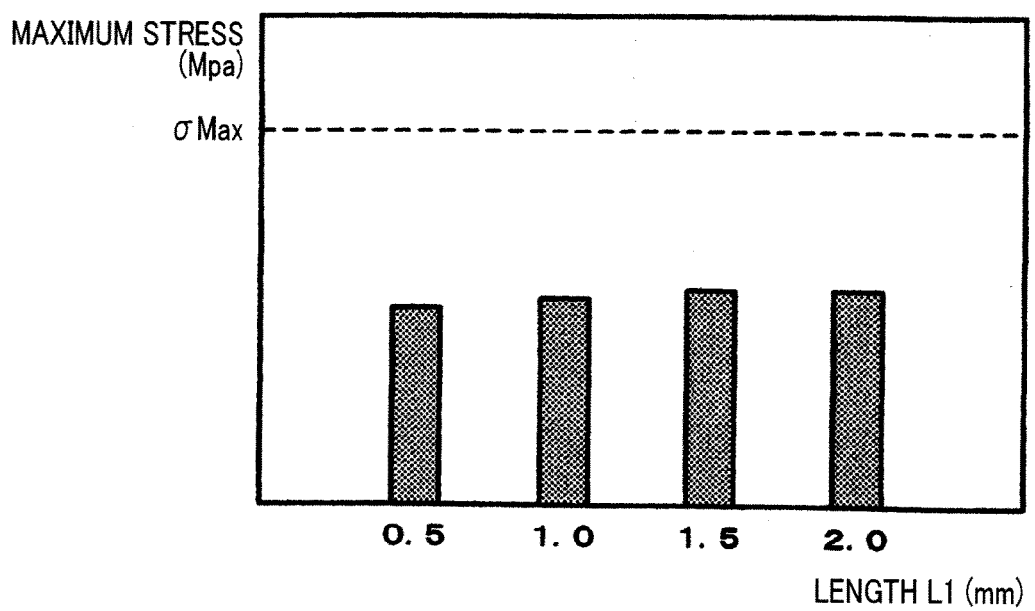
FIG. 5 is a graph showing a relationship between the stress in a sagging part and the length L1 of the sagging part of the temperature sensor.

In FIG. 5, the vertical axis represents the maximum stress applied to the sagging part 32 of the glass sealing body 3, and the horizontal axis represents the length L1 of the sagging part 32. The symbol "δMAX" represents the critical breaking strength of the sagging part 32 of the glass sealing body 3. From the graph of FIG. 5, it was confirmed that the maximum stresses applied to the sagging part 32 of the glass sealing body 3 do not make much difference, and are smaller than the critical breaking strength of the sagging part 32 for all of the cases where the length L1 of the sagging part 32 is, 0.5 mm, 1.0 mm, 1.5 mm, and 2.0 mm, respectively.

From these results, it can be concluded that the stress occurring in the sagging part 32 of the glass sealing body 3 due to the prospected pressure change within a hydrogen tank in which the temperature sensor 1 is installed can be made sufficiently lower than the critical breaking strength by setting the length L1 of the sagging part 32 in the range from 0.5 mm to 2.0 mm.

EXPERIMENT EXAMPLE

The inventors conducted a pressure shock experiment on the temperature sensor 1 placed in a hydrogen atmosphere. In this experiment, it was checked whether the sagging part 32 of the temperature sensor 1 was damaged for each of cases where the length L1 of the sagging part 32 is, 0.5 mm, 1.0 mm, 1.5 mm, and 2.0 mm, respectively.

The pressure shock experiment was such that the atmospheric pressure in the hydrogen atmosphere is increased from 0.6 MPa to 95 MPa in 0.5 seconds, and then decreased from 95 MPa to 0.6 MPa in 30 seconds. This cycle was repeated 1000 times.

In these cycles, the temperature in the hydrogen atmosphere changes between $-45°$ C. and $+85°$ C. with the change of the atmospheric pressure.

The following table shows results of this pressure shock experiment. The symbol "○" represents that no damage was found in the sagging parts 32 of the temperature sensor 1 after completion of the pressure shock experiment. The symbol "x" represents that damage was found in the sagging part 32 of the temperature sensor 1 after completion of the pressure shock experiment.

| L1 (mm) | EVALUATION |
| --- | --- |
| 2.0 | X |
| 1.5 | ○ |
| 1.0 | ○ |
| 0.5 | ○ |

As shown in Table 1, damage was found in one of the sagging parts 32 of the temperature sensor 1 for the case where the length L1 of the sagging part is 2.0 mm, and damage was not found in either one of the sagging parts 32 of the temperature sensor 1 for the cases where the length L1 of the sagging part is 0.5 mm, 1.0 mm, and 1.5 mm, respectively. Accordingly, it is possible to prevent the sagging part 32 from being damaged by setting the length L1 of the sagging part 32 smaller than or equal to 1.5 mm.

As described above, according to the results of the analysis test, when the length L1 of the sagging part 32 is between 0.5 mm and 2.0 mm, the stress occurred in the sagging part 32 is sufficiently lower than the critical breaking strength. On the other hand, according to the results of the pressure shock experiment, damage was found in the sagging part 32 for the case where the length L1 of the sagging part 32 is 2.0 mm.

The results of the analysis test and the pressure shock experiment indicate that the stress occurred in the glass sealing body 3 is affected by not only the pressure applied to the glass sealing body 3 from the outside, but also other factors. Especially, change of the atmospheric temperature, that is, thermal shock resulting from the pressure change affects the stress. Therefore, it may occur that even when the stress applied to the glass sealing body 3 applied from the outside is sufficiently smaller than the critical breaking strength, the sum of this stress and a stress due to other factors such as the thermal shock as a composite stress exceeds the critical breaking strength, depending on the length L1 of the sagging part 32.

This composite stress changes depending on the length L1 of the sagging part 32. It can be concluded that the sagging part 32 was damaged in the pressure shock experiment for the case where the length L1 of the sagging part 32 is 2.0 mm for the reason that the composite stress applied to the glass sealing body 3 exceeded the critical breaking strength. On the other hand, it was confirmed that, when the length L1 of the sagging part 32 of the glass sealing body 3 is smaller than or equal to 1.5 mm, the glass sealing body 3 can withstand the composite stress consisting of the stress due to the pressure shock and the thermal shock resulting from the pressure shock.

The above explained preferred embodiments are exemplary of the invention of the present application which is described solely by the claims appended below. It should be understood that modifications of the preferred embodiments may be made as would occur to one of skill in the art.

What is claimed is:

1. A temperature sensor comprising:
   a thermo-sensitive element;
   a pair of element electrode wires electrically connected to the thermo-sensitive element;
   a glass sealing body that covers the thermo-sensitive element and part of the pair of the element electrode wires; and
   a tablet formed with a pair of insertion holes extending in an axial direction thereof, through which the pair of the element electrode wires pass respectively, wherein
   the glass sealing body includes a sealing part formed so as to extend from an element-side end surface of the tablet, which is on a side of the thermo-sensitive element, toward the thermo-sensitive element, and a sagging part formed in each of the pair of the insertion holes so as to extend integrally from the sealing part, a length of the sagging part in the axial direction being smaller than or equal to 1.5 mm.

2. The temperature sensor according to claim 1, wherein the sagging part is formed in a shape having a convex curved surface whose contour in cross section including a center axis of a corresponding one of the element electrode wires approaches the corresponding element electrode wire with distance from the sealing part.

3. The temperature sensor according to claim 1, wherein the glass sealing body is made of borosilicate glass with added boron oxide.

4. The temperature sensor according to claim 1, wherein the glass sealing body 3 is made of lead-free glass.

5. The temperature sensor according to claim 1, wherein the element electrode wire is made of platinum or platinum alloy containing iridium whose content A is in a range of 0 wt %<A≤20 wt %.

6. The temperature sensor according to claim 1, wherein a linear expansion coefficient $\alpha_g$ of the glass sealing body and a linear expansion coefficient $\alpha_r$ of the element electrode wires satisfy a relationship of $\alpha_g-1$ $(10^{-6}/°\text{ C.})\leq\alpha_r\leq\alpha_g+1$ $(10^{-6}/°\text{ C.})$.

7. The temperature sensor according to claim 1, wherein a sealing thickness t1 between an outer surface of the sealing part and the thermo-sensitive element satisfies a relationship of 0.4 mm≤t1≤3 mm.

8. The temperature sensor according to claim 1, wherein a contact length L2 in the axial direction of a contact part between the sealing part and the element electrode wires satisfies a relationship of 1.4 mm≤L2≤3.0 mm.

9. The temperature sensor according to claim 1, wherein a contact length L3 in the axial direction of a contact part between the sagging part and the element electrode wire satisfies a relationship of 0 mm<L3<1.5 mm.

10. The temperature sensor according to claim 1, wherein the temperature sensor is used in a high-pressure hydrogen atmosphere.

11. The temperature sensor according to claim 1, wherein the sagging part is formed of a glass paste.

12. The temperature sensor according to claim 1, wherein:
   between the pair of the element electrode wires and inner surfaces of the pair of the insertion holes, there are respectively formed gaps that continuously extend between ends of the tablet in the axial direction, and
   the sagging part is formed in each of the gaps so as to extend integrally from the sealing part.

* * * * *